United States Patent [19]

Asada

[11] Patent Number: 5,758,421
[45] Date of Patent: Jun. 2, 1998

[54] METHOD FOR MANUFACTURING FLUID BEARING

[75] Inventor: Takafumi Asada, Hirakata, Japan

[73] Assignee: Matsushita Electric Industrial Co., Ltd., Kadoma, Japan

[21] Appl. No.: 431,961

[22] Filed: May 1, 1995

[30] Foreign Application Priority Data

May 2, 1994 [JP] Japan .................................. 6-093253

[51] Int. Cl.⁶ .................................................. F16C 33/00
[52] U.S. Cl. ........................................................ 29/898.02
[58] Field of Search .................................... 384/120, 114; 29/898.02, 898.054, 898.056, 898.13

[56] References Cited

U.S. PATENT DOCUMENTS

| | | |
|---|---|---|
| 4,228,821 | 10/1980 | Stark . |
| 4,678,348 | 7/1987 | Tielemans et al. .............. 384/114 |
| 4,866,966 | 9/1989 | Hagen . |
| 5,265,334 | 11/1993 | Lucier .............................. 29/898.02 |
| 5,339,523 | 8/1994 | Hasegawa ....................... 29/898.02 |
| 5,579,579 | 12/1996 | Chen ................................ 29/898.02 |

FOREIGN PATENT DOCUMENTS

| | | |
|---|---|---|
| 0 002 292 | 6/1979 | European Pat. Off. . |
| 054 510 | 6/1982 | European Pat. Off. . |
| 58-202921 | 11/1983 | Japan . |
| 0006427 | 1/1986 | Japan ................... 29/898.02 |
| 63-230218 | 9/1988 | Japan . |
| 3-49648 | 7/1991 | Japan . |
| 3-68768 | 10/1991 | Japan . |
| 4008909 | 1/1992 | Japan ................... 384/120 |

*Primary Examiner*—Larry I. Schwartz
*Assistant Examiner*—Marc W. Butler
*Attorney, Agent, or Firm*—Wenderoth, Lind & Ponack, L.L.P.

[57] ABSTRACT

A method for manufacturing a fluid bearing of dynamic pressure type by processing an inner peripheral surface of a sleeve bore to form a dynamic pressure-generating groove. An apparatus includes a guide shaft for being coaxially inserted into the sleeve bore while being rotated and fed axially. The shaft has first and second guide holes, and a plurality of balls held in the first and second guide holes. The balls are harder than the sleeve. Also, a diameter of a circumscribed circle about the balls is set to be larger than an inner diameter of the bore of the sleeve.

5 Claims, 5 Drawing Sheets

METHOD FOR MANUFACTURING FLUID BEARING

BACKGROUND OF THE INVENTION

The present invention relates to an apparatus and method for manufacturing a fluid bearing having a shaft, a sleeve, and a dynamic pressure-generating groove formed on the inner peripheral surface of a bearing of the sleeve which is used in, for example, disk drive devices, rotary head cylinders etc.

In recent years, with the development of bearing-applied equipment having high performance, equipment using fluid bearings are increasingly adopted. As shown in, FIG. 5, in this type of fluid bearing, a bearing shaft 5 is rotatably inserted into a sleeve 3 having a dynamic pressure-generating groove 3A formed on the inner peripheral surface thereof, and lubricating oil is applied to the gap between the bearing shaft 5 and the sleeve 3. A pressure is generated due to the pumping action of the dynamic pressure-generating groove 3A caused by the rotation of the bearing shaft 5 or that of the sleeve 3, with the result that the bearing shaft 5 or the sleeve 3 rotates without contact being made therebetween and with high accuracy.

An example of a conventional apparatus for manufacturing this type of groove-equipped fluid bearing is described below with reference to FIGS. 6A and 6B. As a conventional method for processing a dynamic pressure-generating groove 13A on the inner peripheral surface of a sleeve 13 made of a comparatively soft metal, a method for plastically processing the dynamic pressure-generating groove 13A by using hard balls is known. As an apparatus for carrying out the method, an apparatus as shown in FIGS. 6A and 6B is known. A guide ring 18 is fixed to the leading end 16A of a guide shaft 16. The guide ring 18 has a plurality of guide holes 18A, 18B, 18C, and 18D formed thereon such that the guide holes 18A and 18B and guide holes 18C and 18D are symmetrical and radially arranged with respect to the center axis of the guide ring 18, respectively. Hard balls 17A, 17B, 17C, and 17D are inserted into the guide holes 18A, 18B, 18C, and 18D or pressed thereinto, respectively. The diameter of the leading end 16A is so selected that the sum of the diameter of the leading end 16A, that of the ball 17A, and that of the ball 17B is slightly larger than the inner diameter (d) of the sleeve 13.

The operation of the conventional apparatus for manufacturing the fluid bearing is described below. Referring to FIGS. 6A and 6B, when a rotational speed (W) and a feeding speed (V) are applied to the guide shaft 16 or the guide ring 18 with respect to the sleeve 13, the dynamic pressure-generating groove 13A is formed by plastic processing comprising the motion of the balls 17A, 17B, 17C, and 17D. In processing the herringbone-shaped dynamic pressure-generating groove 13A as shown in FIG. 5, when the balls 17A, 17B, 17C, and 17D have fed to approximately the center of the sleeve 13, the rotational direction of the guide shaft 16 is switched to the direction opposite to the rotational direction (W) without changing the feeding speed (V) of the guide shaft 16.

The above-described construction has, however, the following problem: Fluid bearings of this type having a smaller diameter are increasingly manufactured in recent years. But if the inner diameter of the sleeve is equal to or less than 2 mm, the diameter of the leading end 16A inevitably becomes as small as 1 mm or less, with the result that the guide shaft 16 may be broken during plastic processing.

SUMMARY OF THE INVENTION

Accordingly, an object of the present invention is to provide an apparatus and a method for manufacturing fluid bearing capable of preventing a guide shaft from being broken during plastic processing even though a diameter of a leading end of the guide shaft becomes as small as, for example, 1 mm or less.

In accomplishing these and other aspects, according to one aspect of the present invention, there is provided an apparatus, for manufacturing fluid bearing of dynamic pressure type, by being inserted into a bore of a sleeve and processing an inner peripheral surface of the bore to form a dynamic pressure-generating groove, comprising:

a guide shaft for coaxially inserting into the bore of the sleeve while being rotated and fed axially, the shaft having a first guide hole in a vicinity of a front end thereof; and a plurality of balls held radially into the first guide hole of the shaft, the balls being harder than the sleeve and bringing into contact with each other, and a diameter of a circumscribed circle about the balls being set to be larger than an inner diameter of the bore of the sleeve.

According to another aspect of the present invention, there is provided a method for manufacturing a fluid bearing of dynamic pressure type, by using an apparatus for manufacturing a fluid bearing of dynamic pressure type comprising: a guide shaft for coaxially inserting into a bore of a sleeve while being rotated and fed axially, the shaft having a first guide hole in a vicinity of a front end thereof; and a plurality of balls held radially into the first guide hole of the shaft, the balls being harder than the sleeve and bringing into contact with each other, and a diameter of a circumscribed circle about the balls being set to be larger than an inner diameter of the bore of the sleeve, the method comprising steps of:

holding the sleeve on a base;

inserting the guide shaft into the bore of the sleeve;

rotating and feeding the guide shaft into the bore of the sleeve in a rotating direction and a feeding direction to process an inner peripheral surface of the bore to form a dynamic pressure-generating groove; and removing the guide shaft from the bore of the sleeve; and removing the sleeve from the base.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
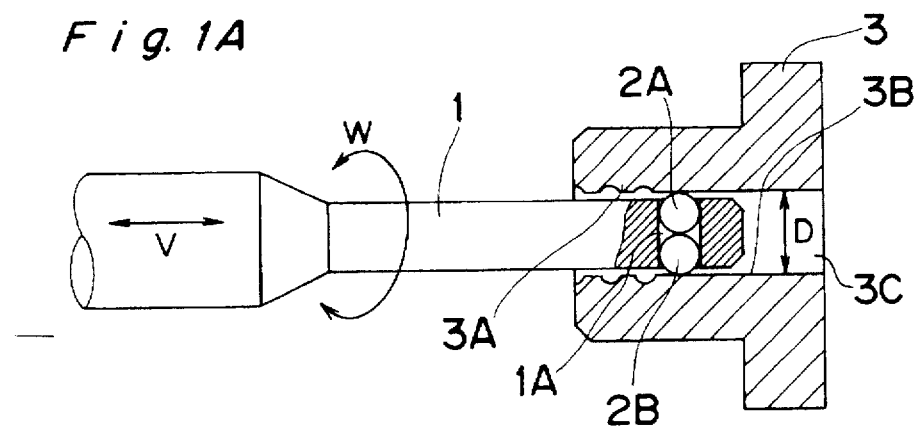
FIGS. 1A and 1B are sectional views showing a part of an apparatus for manufacturing a fluid bearing according to a first embodiment of the present invention.

Before the description of the present invention proceeds, it is to be noted that like parts are designated by like reference numerals throughout the accompanying drawings.

Figure 1B:
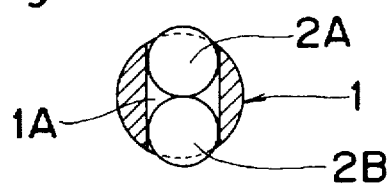

An apparatus for manufacturing a fluid bearing according to a first embodiment of the present invention is described below with reference to FIGS. 1A and 1B. Referring to FIGS. 1A and 1B, reference numeral 1 denotes a guide shaft made of cemented carbide. At least one guide hole 1A arranged radially and passing through the center axis of the guide shaft 1 is formed in the vicinity of the leading end thereof. Hard balls 2A and 2B harder than a sleeve 3 to be processed are inserted into the guide hole 1A or pressed thereinto, with the balls 2A and 2B in contact with each other. The guide shaft 1 has an operation means for applying thereto a rotational speed in a rotational direction (W) and a feeding speed in an axial direction (V) shown in FIG. 3. Reference numeral 3 denotes the sleeve made of copper alloy or aluminum alloy etc. and the diameter of a circumscribed circle about the balls 2A and 2B is so selected that the diameter is larger than the inner diameter (D) of the bore 3C of the sleeve 3 by 10–100 microns. The balls 2A and 2B are made of steel or sapphire which is harder than the sleeve 3. That is, it is necessary for the ball to have such a hardness that a desired dynamic pressure-generating groove can be formed on the inner peripheral surface of the bore of the sleeve.

Figure 3:
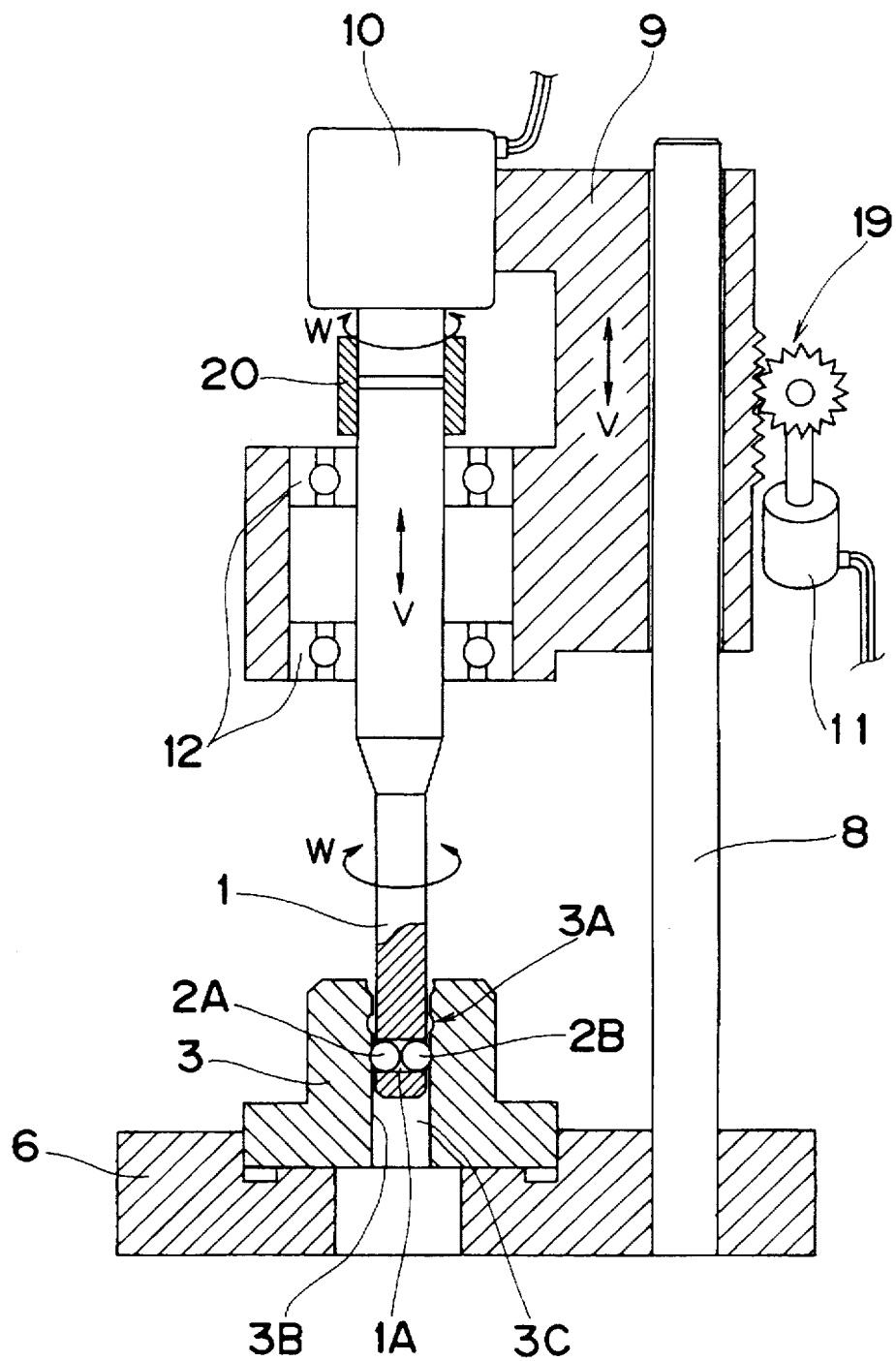
FIG. 3 is a sectional view showing the whole apparatus of the first embodiment.

In FIG. 3, reference numeral 6 denotes a base serving as a chuck for holding the sleeve 3, 8 denotes a guide bar, 9 denotes a moving body for holding and moving the guide shaft 1 in the feeding direction (V) while guided by the guide bar 8, 10 denotes a first motor for rotating the guide shaft 1 in the rotational direction (W), 11 denotes a second motor for back and forth feeding the moving body together with the guide shaft 1 by engaging a pinion gear 19 of a rotating shaft of the second motor 11 with a rack of the moving body 9, 12 denotes a bearing, and 20 denotes a coupling for connecting the first motor 10 to the guide shaft 1.

Figure 6A:
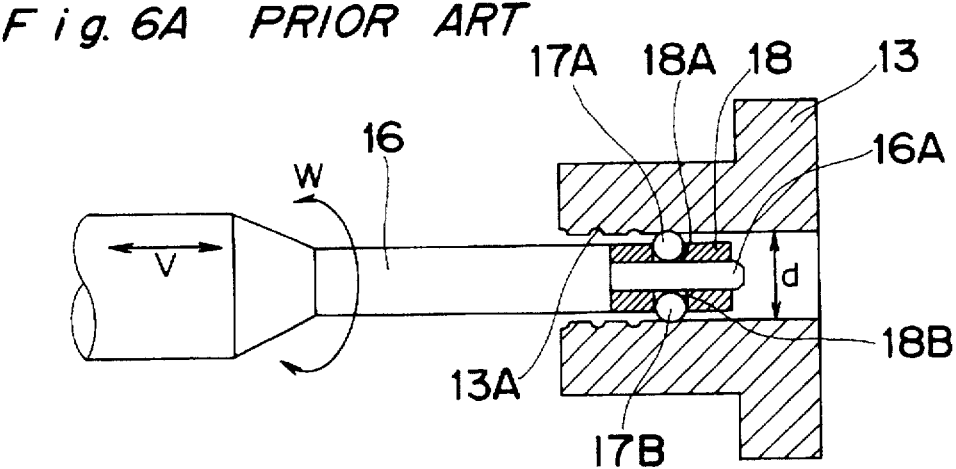
FIGS. 6A and 6B are sectional views showing a part of a conventional apparatus for manufacturing a fluid bearing.
Figure 6B:
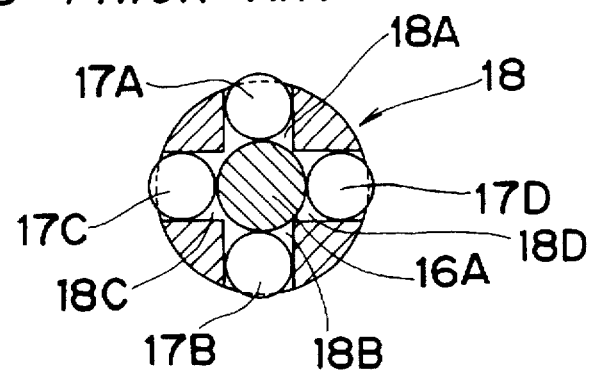
Figure 7:
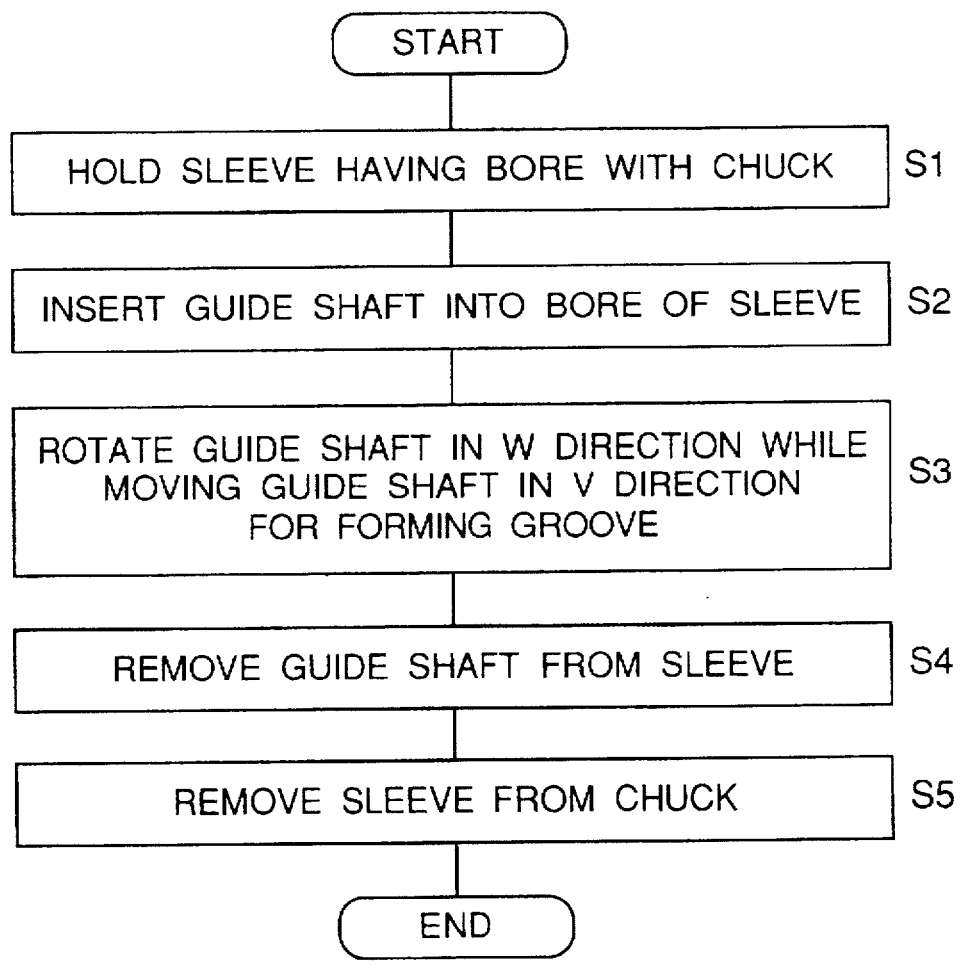
FIG. 7 is a flowchart showing a method for manufacturing a fluid bearing according to the first embodiment of the present invention.

The operation of the apparatus for manufacturing a fluid bearing having the above-described construction is described below with reference to Figs. 1A, 1B, 3, and 7. First, at step S1, the sleeve 3 having the bore 3C to be processed is held by the base 6. At step S2, the guide shaft 1 having the balls 2A and 2B in the hole 1A is fed into the bore 3C of the sleeve 3 by driving of the second motor 11. At step S3, the guide shaft 1 is rotated in the rotational direction (W) by the first motor 10 and fed in the feeding direction (V) by the second motor 11. That is, in the sleeve 3, a speed is applied to the guide shaft 1 in the feeding direction (V) and the rotational direction (W), with the result that the balls 2A and 2B are fed into the bore 3C of the sleeve 3 and closely contacting the inner peripheral surface 3B of the bore 3C of the sleeve 3. In this manner, the dynamic pressure-generating groove 3A is formed on the inner peripheral surface 3B of the bore 3C by plastic processing. At this time, the guide shaft 1 has a high strength in processing even though the outer diameter of the guide shaft 1 is very small, and thus, the processing can be accomplished without damage. As one example, the inner diameter of the bore is (0.8 mm–10 microns) and the outer diameter of the ball is 0.4 mm. As another example, the inner diameter of the bore is (0.6 mm–10 microns) and the outer diameter of the ball is 0.3 mm while the feeding speed is 2–3 cm/second when the feeding speed is 1 cm/second by using the apparatus in FIGS. 6A and 6B. That is, the feeding speed can be faster than the conventional apparatus. At step S4, after the processing for forming the dynamic pressure-generating groove 3B is completed, the guide shaft 1 is removed from the bore 3C of the sleeve 3A by reverse driving of the second motor 11 and then the sleeve 3 is removed from the base 6 at step S5.

According to the first embodiment, since the leading end of the guide shaft which is provided in the conventional apparatus is unnecessary, the accuracy of the dynamic pressure-generating groove 3B can be improved by increasing only the accuracy of the outer diameters of the two balls 2A and 2B. In the conventional apparatus, it is necessary to increase the accuracy of the leading end of the guide shaft and the outer diameters of the balls and then it is difficult to improve the accuracy of the dynamic pressure-generating groove.

Figure 2A:
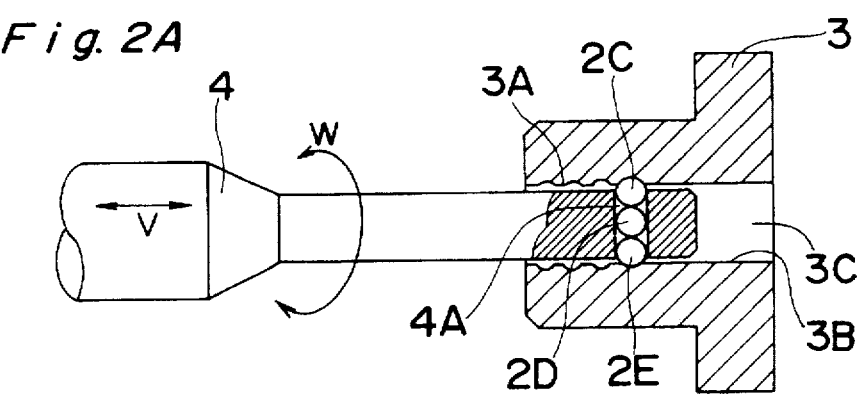
FIGS. 2A and 2B are sectional views showing a part of an apparatus for manufacturing a fluid bearing according to a second embodiment of the present invention.
Figure 2B:
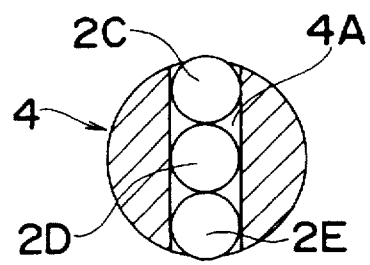

FIGS. 2A and 2B are sectional views showing an apparatus for manufacturing a fluid bearing according to a second embodiment of the present invention. Reference numeral 4 denotes a guide shaft. Three balls 2C, and 2D or more balls are inserted into a guide hole 4A or pressed thereinto, with the balls 2C, 2D, and 2E in contact with each other. In the second embodiment, the steel balls 2C, 2D, and 2E each having a diameter of 0.4mm may be used.

Because the number of balls to be used in the second embodiment are more than that of those to be used in the first embodiment, the diameters of the balls to be used in the second embodiment can be smaller than the diameters of those to be used in the first embodiment.

Figure 2C:
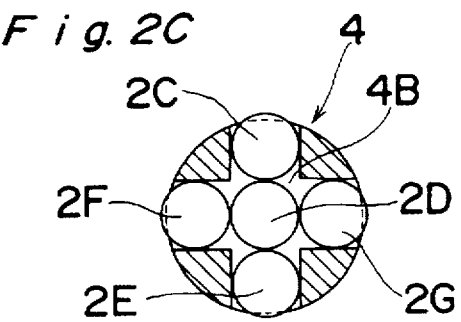
FIG. 2C is a sectional view showing a part of an apparatus for manufacturing a fluid bearing according to a third embodiment of the present invention.

FIG. 2C shows a third embodiment of the present invention wherein five balls 2C, 2D, 2E, 2F, and 2G are inserted into guide holes 4B of the guide shaft 4 or pressed thereinto, with the balls 2C, 2D, 2E, 2F, and 2G in contact with each other. According to the third embodiment, the balls are arranged in the guide hole of the guide shaft in two radial directions perpendicular to each other and thus the arrangement of the balls are in balance as compared with the first and second embodiments.

Figure 4:
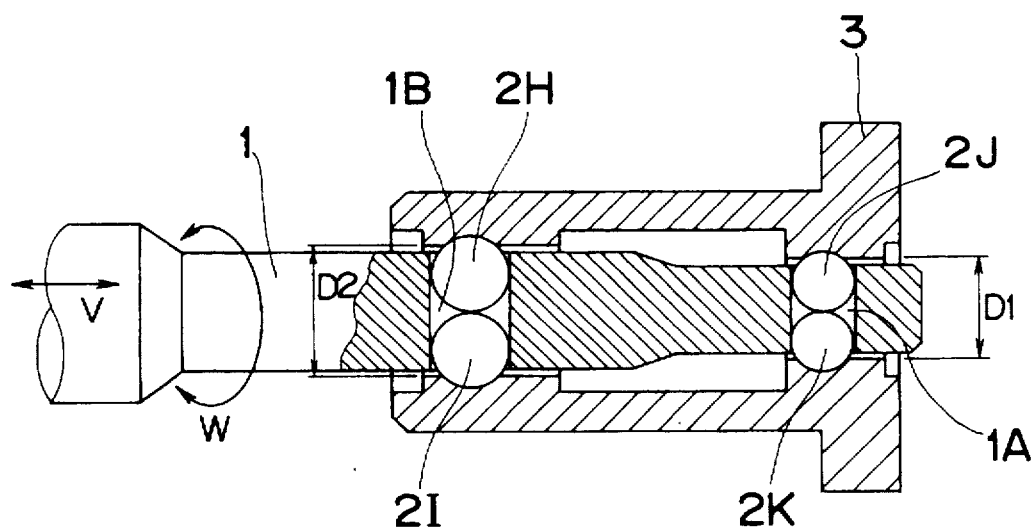
FIG. 4 is a sectional view showing an apparatus for manufacturing a fluid bearing according to a fourth embodiment of the present invention.
Figure 5:
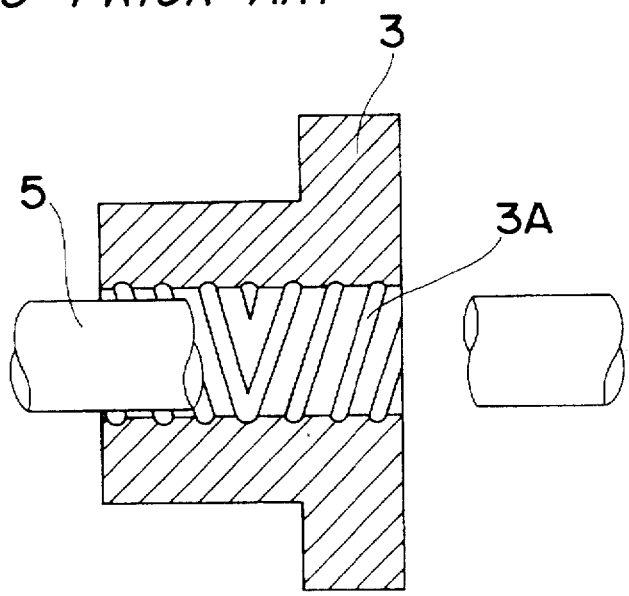
FIG. 5 is a sectional view showing a fluid bearing formed by a conventional apparatus and the embodiments of the present invention.

FIG.4 shows a fourth embodiment of the present invention. The guide shaft 4 has two guide holes 1A and 1B. The guide hole 1A holds two balls 2J and 2K and guide hole 1B holds two balls 2H and 2I in the similar manner to the above embodiments. The outer diameter of each of the balls 2H and 2I are larger than that of each of the balls 2J and 2K. The outer diameter Di of the portion of the guide shaft 4 where the guide hole 1A is formed is smaller than that D2 of the portion of the guide shaft 4 where the guide hole 1B is formed. In the fourth embodiment, at the same time, two dynamic pressure-generating grooves can be formed at the bores of the sleeve 3 with different inner diameters.

In the embodiments, the outer diameters of the balls held in one guide hole can be the same as or be different from each other.

As described above, according to the embodiments of the present invention, the guide shaft having a small diameter and yet a high strength can be constructed and thus, the apparatus provides a fluid bearing having a small diameter.

As described above, according to the present invention, the dynamic pressure-generating groove can be formed on the inner peripheral surface of the bore of the sleeve having a small inner diameter by inserting a plurality of balls into the guide hole formed on the guide shaft, with the balls in contact with each other and then feeding the guide shaft axially and rotating it.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a fluid bearing of dynamic pressure type, by using an apparatus for manufacturing a fluid bearing of dynamic pressure type, said apparatus including a guide shaft for being coaxially inserted into a bore of a sleeve while said guide shaft is rotated and fed in an axial direction, said shaft having a first guide hole located in the vicinity of a front end of said shaft and a second guide hole axially spaced from said first guide hole;

a plurality of balls disposed in said first guide hole of said shaft, said balls being harder than said sleeve and adapted to contact a first inner peripheral surface of said sleeve, and a diameter of a circle circumscribing said balls being larger than an inner diameter of said sleeve bore at said first inner peripheral surface; and a plurality of balls disposed in said second guide hole of said shaft, said balls being harder than said sleeve and adapted to contact a second inner peripheral surface of said sleeve, and a diameter of a circle circumscribing said balls being larger than an inner diameter of said sleeve bore at said second inner peripheral surface, wherein an outer diameter of an end portion of said guide shaft where said first guide hole is formed is smaller than an outer diameter of a base portion of said guide shaft where said second guide hole is formed, said method comprising:

holding said sleeve on a base for fixedly supporting said sleeve;

inserting said plurality of balls held in said first guide hole of said guide shaft and said plurality of balls held in said second guide hole of said guide shaft into said bore of said sleeve which is fixedly supported by said base;

rotating and axially feeding said guide shaft in a rotating direction and a feeding direction into said sleeve bore while said sleeve is fixedly supported by said base so as to process said first inner peripheral surface of said sleeve bore by said balls held in said first guide hole of said guide shaft and said second inner peripheral surface of said sleeve bore by said balls held in said second guide hole of said guide shaft to form dynamic pressure-generating grooves on said first and second inner peripheral surfaces of said sleeve at the same time;

removing said guide shaft of said bore of said sleeve; and removing said sleeve from said base.

2. The method of manufacturing a fluid bearing of dynamic pressure type as claimed in claim 1, wherein each of said balls disposed in said first and second guide holes is formed of sapphire for plastically processing of said inner peripheral surfaces of said sleeve.

3. A method of manufacturing a fluid bearing, said method comprising:

fixedly securing a sleeve on a base, said sleeve having an axial through bore defining a first inner peripheral portion and a second inner peripheral portion;

providing a guide shaft having a first through hole holding a plurality of balls, and a second through hole holding a plurality of balls;

inserting said guide shaft into said sleeve bore, wherein a sum of the diameters of said plurality of balls in said first guide hole is greater than an inner diameter of said axial through bore at said first inner peripheral portion, and a sum of the diameters of said balls in said second guide hole is greater than an inner diameter of said axial through bore at said second inner peripheral portion;

rotating and axially moving said guide shaft in said sleeve bore so as to simultaneously form grooves in said first and second inner peripheral portions of said axial through bore;

removing said guide shaft from said sleeve bore; and removing said sleeve from said base.

4. The method of manufacturing a fluid bearing as claimed in claim 3, wherein each of said balls disposed in said first and second guide holes is formed of sapphire for plastically processing said first and second inner peripheral portions of said sleeve.

5. The method of manufacturing a fluid bearing of dynamic pressure type as claimed in claim 3, wherein said first and second through holes are provided in first and second sections of said guide shaft, respectively, and said first section of said guide shaft has an outer diameter which is smaller than an outer diameter of said second section of said guide shaft.

* * * * *